United States Patent
Khan et al.

(10) Patent No.: US 12,470,654 B2
(45) Date of Patent: Nov. 11, 2025

(54) SYSTEMS AND METHODS FOR NETWORK-BASED IDENTIFICATION OF PRIORITY SERVICES

(71) Applicant: Verizon Patent and Licensing Inc., Basking Ridge, NJ (US)

(72) Inventors: Kashif Khan, Keller, TX (US); Danysel Barthelme, Frisco, TX (US); Ronald E. Collier, II, Arlington, TX (US); Ertao Li, Plano, TX (US); Steve L. Padilla, Grapevine, TX (US); Gaurav Patel, McKinney, TX (US); Shawn R. Pugh, Easton, PA (US); Shujaat Ali Siddique, Hillsborough, NJ (US); Daniel L. Walker, Wall Township, NJ (US); John Cao Vinh Nguyen, Trophy Club, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 699 days.

(21) Appl. No.: 17/664,740

(22) Filed: May 24, 2022

(65) Prior Publication Data
US 2023/0388415 A1    Nov. 30, 2023

(51) Int. Cl.
*H04W 72/56*    (2023.01)
*H04M 3/436*    (2006.01)
*H04W 4/16*    (2009.01)
*H04W 4/90*    (2018.01)
*H04W 28/02*    (2009.01)

(52) U.S. Cl.
CPC .......... *H04M 3/4365* (2013.01); *H04W 4/16* (2013.01); *H04W 4/90* (2018.02); *H04W 28/0284* (2013.01); *H04W 72/56* (2023.01)

(58) Field of Classification Search
CPC . H04M 3/4365; H04W 28/0284; H04W 4/16; H04W 4/90; H04W 72/56
See application file for complete search history.

(56) References Cited

U.S. PATENT DOCUMENTS

| 10,277,627 | B1 * | 4/2019 | Mehta | H04M 3/436 |
| 2015/0127759 | A1 * | 5/2015 | Siegel | H04L 63/10 |
| | | | | 709/229 |
| 2022/0240213 | A1 * | 7/2022 | Ly | H04W 48/18 |

FOREIGN PATENT DOCUMENTS

| CN | 1972475 A | * | 5/2007 | ............ H04B 7/26 |
| WO | WO-9631015 A1 | * | 10/1996 | ............ H04W 72/10 |

* cited by examiner

*Primary Examiner* — Matthew D. Anderson
*Assistant Examiner* — Dung L Lam

(57) ABSTRACT

A network device may receive, from a user device, a call associated with a telephone number, where the call is intended for a priority service associated with the telephone number. The network device may identify the call as a priority call based on the telephone number associated with the call, and may determine that a network overload condition exists. The network device may associate a priority tag with the call based on identifying the call as a priority call. The network device may cause the call to be provided preferential treatment, while the call is transmitted for the priority service during the network overload condition, based on the priority tag.

20 Claims, 14 Drawing Sheets

| Session Priority AVP Value | SIP RPH Value | Reservation Priority AVP Value |
|---|---|---|
| x | ems.0 | x |
| *** | ems.1 | *** |
| *** | ems.2 | *** |
| y | ems.x | y |

FIG. 1F

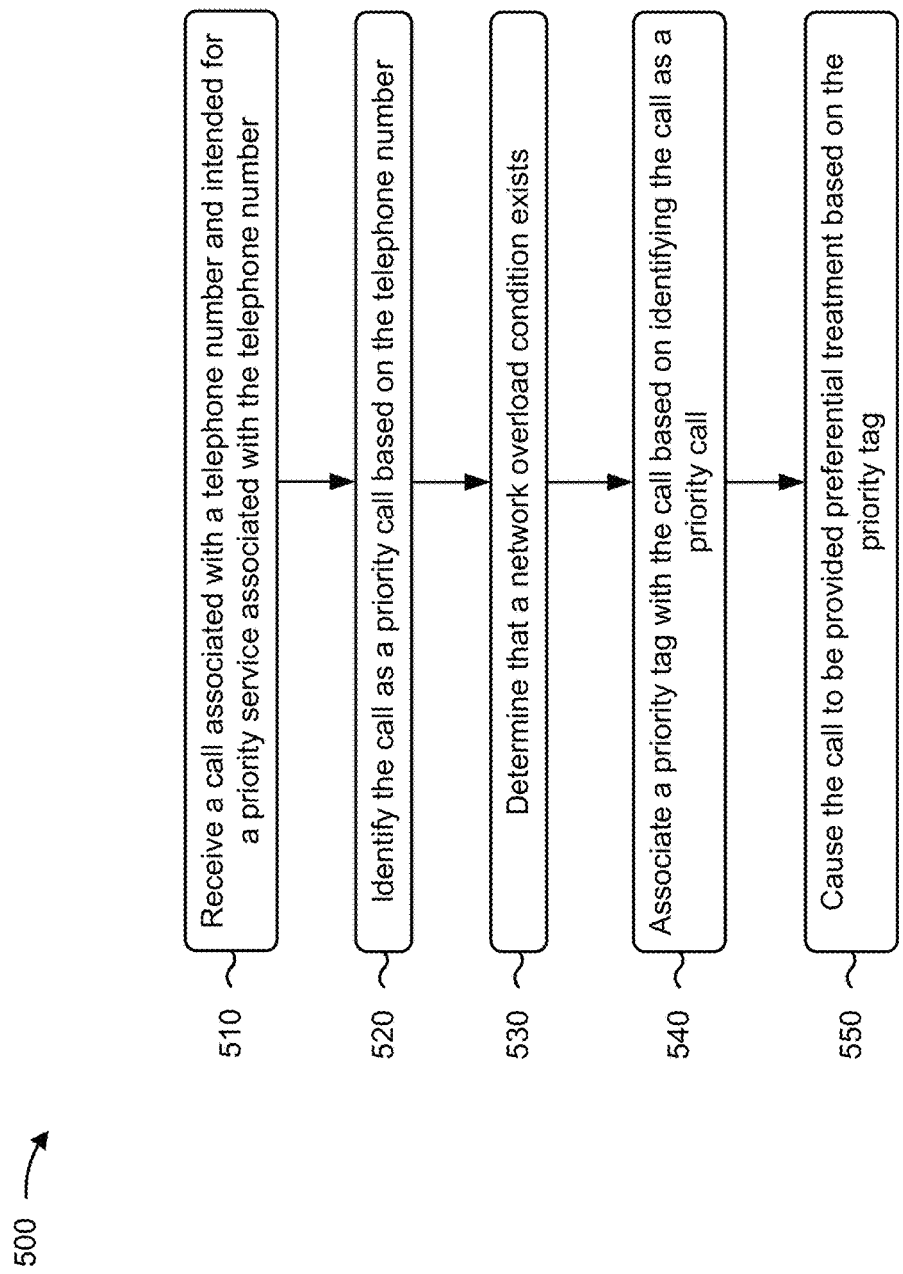

SYSTEMS AND METHODS FOR NETWORK-BASED IDENTIFICATION OF PRIORITY SERVICES

BACKGROUND

A network, such as a fourth generation (4G) network or a fifth generation (5G) network, may experience a network overload condition when particular events (e.g., floods, earthquakes, hurricanes, blizzards, terrorist attacks, and/or the like) occur.

BRIEF DESCRIPTION OF THE DRAWINGS

FIGS. 1A-1J are diagrams of an example associated with network-based identification of priority services.

FIG. 5 is a flowchart of an example process for network-based identification of priority services.

DETAILED DESCRIPTION OF EXAMPLE EMBODIMENTS

Figure 1A:
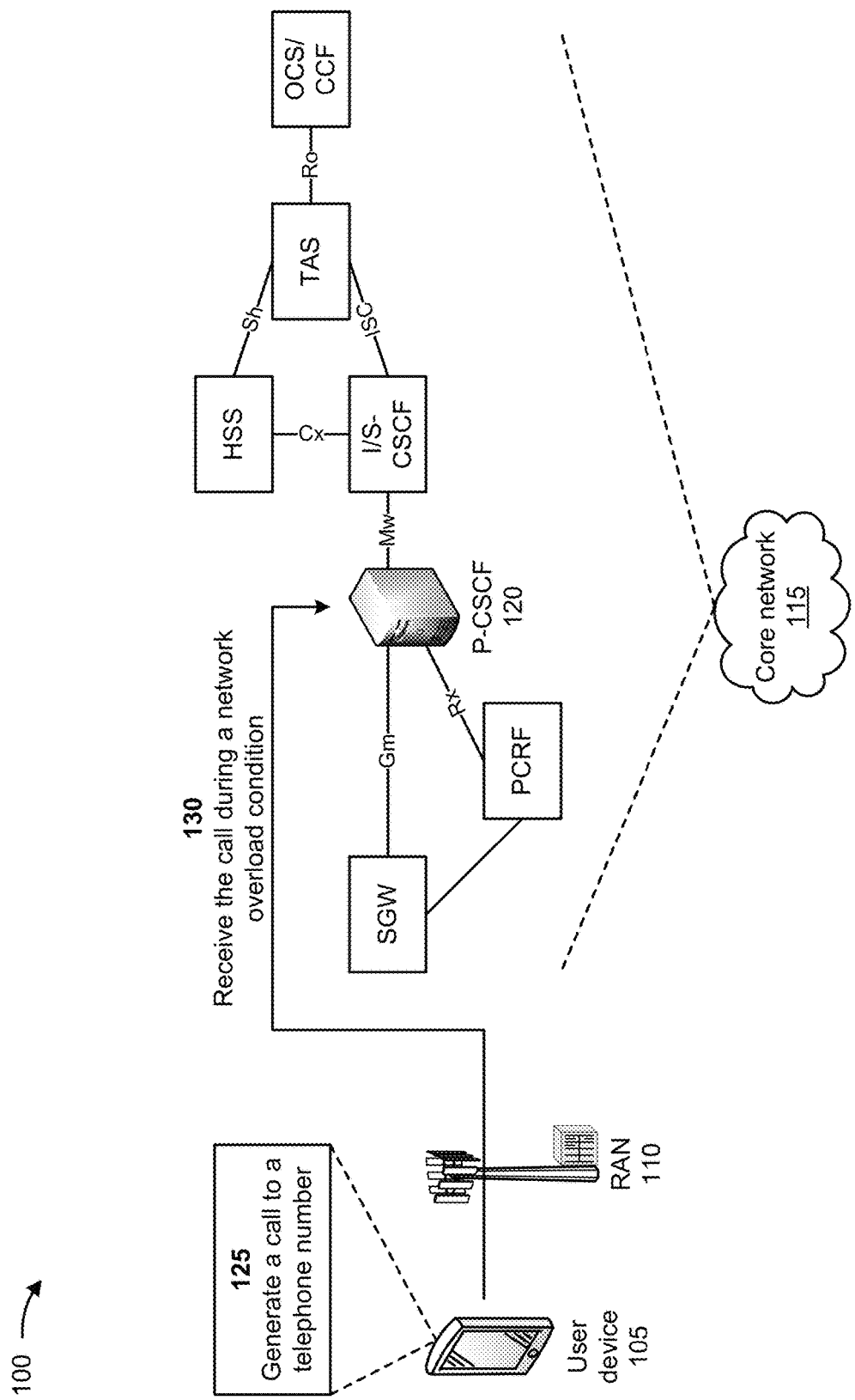

The following detailed description of example implementations refers to the accompanying drawings. The same reference numbers in different drawings may identify the same or similar elements.

Currently, some calls that are high priority in nature (e.g., a 988 suicide hotline call, a call to a local police department, a call to a local fire department, and/or the like), are not identified at the network level as high priority calls. When these calls are initiated by users on user equipment (UE) during a network overload condition, a network may most likely drop these types of calls regardless of their actual priority because they are not designated as prioritized at a network level. The network fails to identify such priority calls as high priority calls since the network currently does not provide an end-to-end priority call identification mechanism during network overload conditions. Thus, the network fails to ensure that the priority calls are identified and handled as high priority calls when the network is in an overload condition. Thus, lack of existing mechanisms for handling priority calls during a network overload condition cause the network to excessively consume computing resources (e.g., processing resources, memory resources, communication resources, and/or the like), networking resources, and/or other resources associated with causing user devices to place priority calls multiple times before connecting to priority services, handling multiple priority calls from the same user devices, handling dropped priority calls, failing to connect priority calls to priority services, and/or the like.

Some implementations described herein provide a network device (e.g., a proxy call session control function (P-CSCF)) that provides network-based identification of priority services. For example, the P-CSCF may receive, from a user device, a call associated with a telephone number, where the call is intended for a priority service associated with the telephone number. The P-CSCF may identify the call as a priority call based on the telephone number associated with the call, and may determine that a network overload condition exists. The P-CSCF may associate a priority tag with the call based on identifying the call as a priority call. The P-CSCF may cause the call to be provided preferential treatment, while the call is transmitted for the priority service during the network overload condition, based on the priority tag, in contrast to untagged calls that do not receive this preferential treatment.

In this way, the P-CSCF provides network-based identification of priority services. For example, the P-CSCF may ensure that a priority call (e.g., a 988 suicide hotline call, a call to a local police department, a call to a local fire department, and/or the like) has an increased probability of call completion and is not dropped when a network experiences an overload condition. Thus, the P-CSCF may conserve computing resources, networking resources, and/or other resources that would otherwise have been consumed by causing user devices to place priority calls multiple times before connecting to priority services, handling multiple priority calls from the same user devices, handling dropped priority calls, failing to connect priority calls to priority services, and/or the like.

FIGS. 1A-1J are diagrams of an example 100 associated with network-based identification of priority services. As shown in FIGS. 1A-1J, example 100 includes a user device 105, a RAN 110, and a core network 115. The core network 115 may include a P-CSCF 120, a serving gateway (SGW) or a user plane function (UPF), a policy and charging rules function (PCRF) or a policy control function (PCF), a home subscriber server (HSS), an interrogating or serving CSCF (I/S-CSCF), a telephony application server (TAS), and an online charging system (OCS)/charging collection function (CCF). Further details of the user device 105, the RAN 110, the core network 115, the P-CSCF 120, the network analytics engine, the content server, the PCRF, the PCF, the HSS, the I/S-CSCF, the TAS, and the OCS/CCF are provided elsewhere herein. Although only a single user device 105 and RAN 110 are depicted in FIG. 1A, in some implementations multiple user devices 105 and RANs 110 may be associated with the core network 115. Furthermore, the core network 115 shown in FIGS. 1A, 1B, and 1G-1J includes network devices associated with a 4G network, and the core network 115 shown in FIGS. 1C and 1D includes network devices associated with a 5G network.

As shown in FIG. 1A, and by reference number 125, the user device 105 may generate a call to a telephone number. For example, a user may utilize the user device 105 to input digits of the telephone number, and the user device 105 may generate the call to the telephone number based on the inputted digits. In some implementations, the telephone number may be associated with a priority service, such as a suicide hotline, a police department, a fire department, a hospital, a poison control service, and/or the like. Although implementations described herein relate to the P-CSCF 120 performing functions, in other implementations, other network devices of the core network 115 may perform one or more of the functions described as being performed by the P-CSCF 120.

As further shown in FIG. 1A, and by reference number 130, the P-CSCF 120 may receive the call during a network overload condition. For example, the P-CSCF 120 may determine that a network overload condition exists in the core network 115 based on a traffic load associated with the core network 115 and/or the P-CSCF 120, an available bandwidth associated with the core network 115 and/or the P-CSCF 120, an indication of occurrence of a particular event, and/or the like. The particular event may include a man-made disaster (e.g., a plane crash, a ship sinking, a building explosion, a nuclear meltdown, a chemical spill, and/or the like), a natural disaster (e.g., a flood, an earthquake, a wildfire, a hurricane, a blizzard, and/or the like), a terrorist attack, and/or the like. When the P-CSCF 120 determines that the network overload condition exists, the P-CSCF 120 may determine whether the call is received during the network overload condition. If the call is not received during the network overload condition, the P-CSCF 120 may process the call according to typical processing procedures. If the call is received during the network overload condition, the P-CSCF 120 may process the call as described below.

Figure 1B:
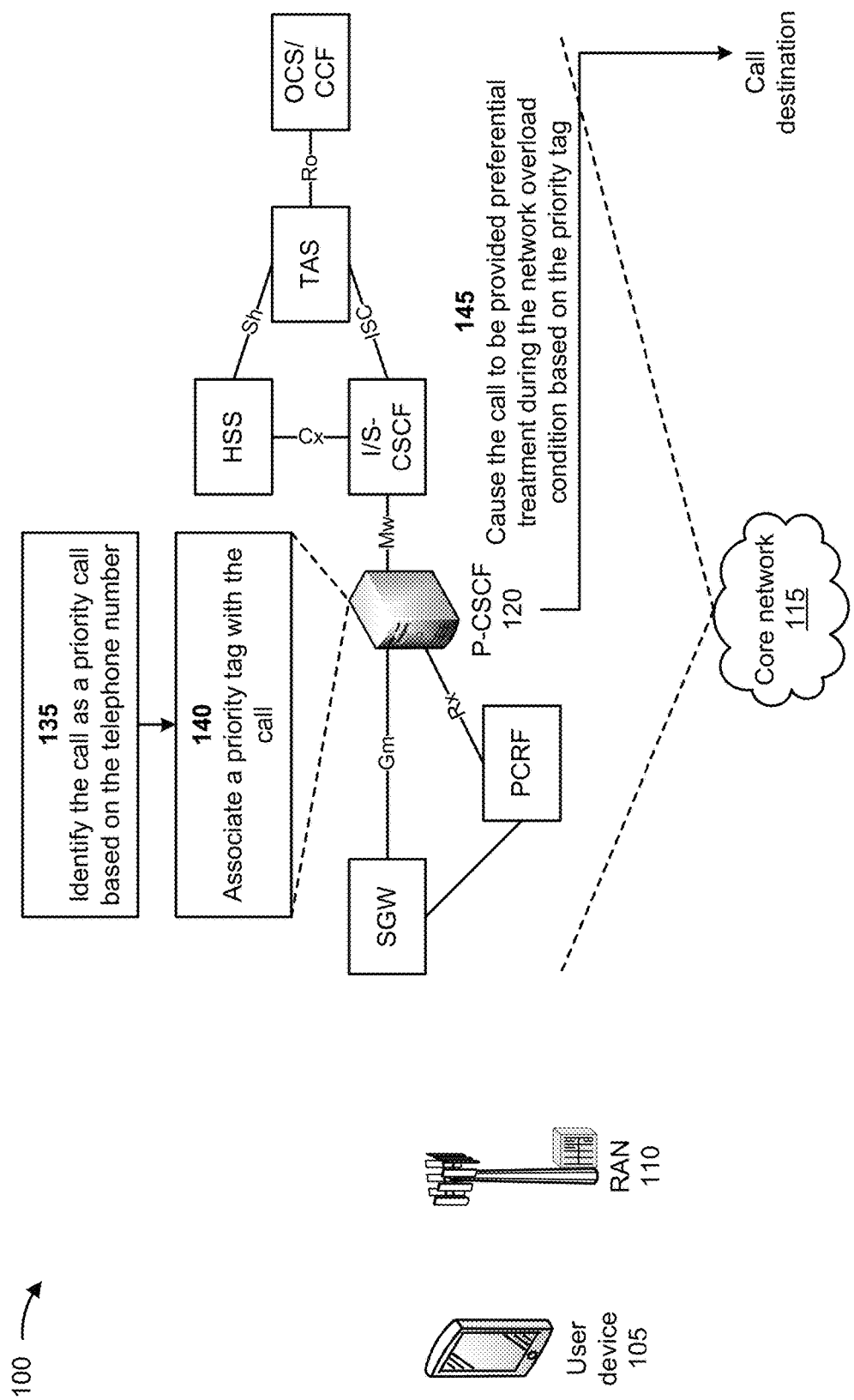

As shown in FIG. 1B, and by reference number 135, the P-CSCF 120 may identify the call as a priority call based on a call identifier (e.g., the telephone number) associated with the call. For example, the P-CSCF 120 may identify the call as a priority call by comparing the call identifier (e.g., digits of the telephone number) with a list of call identifiers (e.g., telephone numbers) associated with priority services. When the call identifier (e.g., the digits of the telephone number) match a call identifier (e.g., digits of a telephone number) in the list of call identifiers (e.g., telephone numbers) associated with priority services, the P-CSCF 120 may identify the call as a priority call. When the call identifier (e.g., the digits of the telephone number) fail to match a call identifier (e.g., digits of a telephone number) in the list of call identifiers (e.g., telephone numbers) associated with priority services, the P-CSCF 120 may not identify the call as a priority call. In some implementations, the list of call identifiers (e.g., telephone numbers) associated with priority services may include call identifiers (e.g., telephone numbers) associated with a suicide hotline, a police department, a fire department, a hospital, a poison control service, and/or the like.

As further shown in FIG. 1B, and by reference number 140, the P-CSCF 120 may associate a priority tag with the call. For example, the P-CSCF 120 may associate the priority tag with the call based on identifying the call as a priority call and based on determining that the network overload condition exists. When the call is not identified as a priority call or a network overload condition does not exist, the P-CSCF 120 may not associate the priority tag with the call. The priority tag may indicate that the call is a priority call to subsequent network devices in a path of call delivery. In some implementations, the priority tag may include a reservation priority attribute-value pair (AVP) and a multimedia priority service AVP, a session initiation protocol (SIP) resource priority header, a session priority AVP, and/or the like.

The P-CSCF 120 may associate the priority tag with the call so that all subsequent steps in a delivery setup of the call may receive preferential treatment during the network overload condition. All subsequent call steps for different protocols may include priority tags indicating that the call is a priority call. The subsequent network devices may identify the call as a priority call, may mark the call accordingly (e.g., based on the different protocols), and may provide preferential treatment to the call during the network overload condition. For example, the P-CSCF 120 may utilize the reservation priority AVP and the multimedia priority service AVP, as the priority tag, to indicate the priority of the call to the PCRF via an Rx interface between the P-CSCF 120 and the PCRF. The P-CSCF 120 may utilize the reservation priority AVP and the multimedia priority service AVP, as the priority tag, to indicate the priority of the call to the SGW via a Gm interface between the P-CSCF 120 and the SGW. The P-CSCF 120 may utilize the reservation priority AVP and the multimedia priority service AVP, as the priority tag, to indicate the priority of the call to the I/S-CSCF via an Mw interface between the P-CSCF 120 and the I/S-CSCF.

The I/S-CSCF may utilize the SIP resource priority header, as the priority tag, to indicate the priority of the call to the TAS via an ISC interface between the I/S-CSCF and the TAS. The I/S-CSCF may utilize the session priority AVP, as the priority tag, to indicate the priority of the call to the HSS via a Cx interface between the I/S-CSCF and the HSS. The HSS may utilize the session priority AVP, as the priority tag, to indicate the priority of the call to the TAS via an Sh interface between the HSS and the TAS. The TAS may utilize the session priority AVP, as the priority tag, to indicate the priority of the call to the OCS/CCF via an Ro interface between the TAS and the OCS/CCF.

As further shown in FIG. 1B, and by reference number 145, the P-CSCF 120 may cause the call to be provided preferential treatment during the network overload condition based on the priority tag. For example, when causing the call to be provided preferential treatment during the network overload condition based on the priority tag, the P-CSCF 120 may cause, based on the priority tag, one or more other network devices (e.g., the SGW, the PCRF, the I/S-CSCF, the HSS, the TAS, the OCS/CCF, and/or the like) to identify the call as a priority call and to provide preferential treatment for the call during the network overload condition. In some implementations, a connection may be established between the user device 105 and a priority service (e.g., a call destination) associated with the telephone number based on causing the call to be provided preferential treatment during the network overload condition. In some implementations, all subsequent call steps for different protocols may include priority tags indicating that the call is a priority call. The subsequent network devices may identify the call as a priority call, may mark the call accordingly (e.g., based on the different protocols), and may provide preferential treatment to the call during the network overload condition.

Figure 1C:
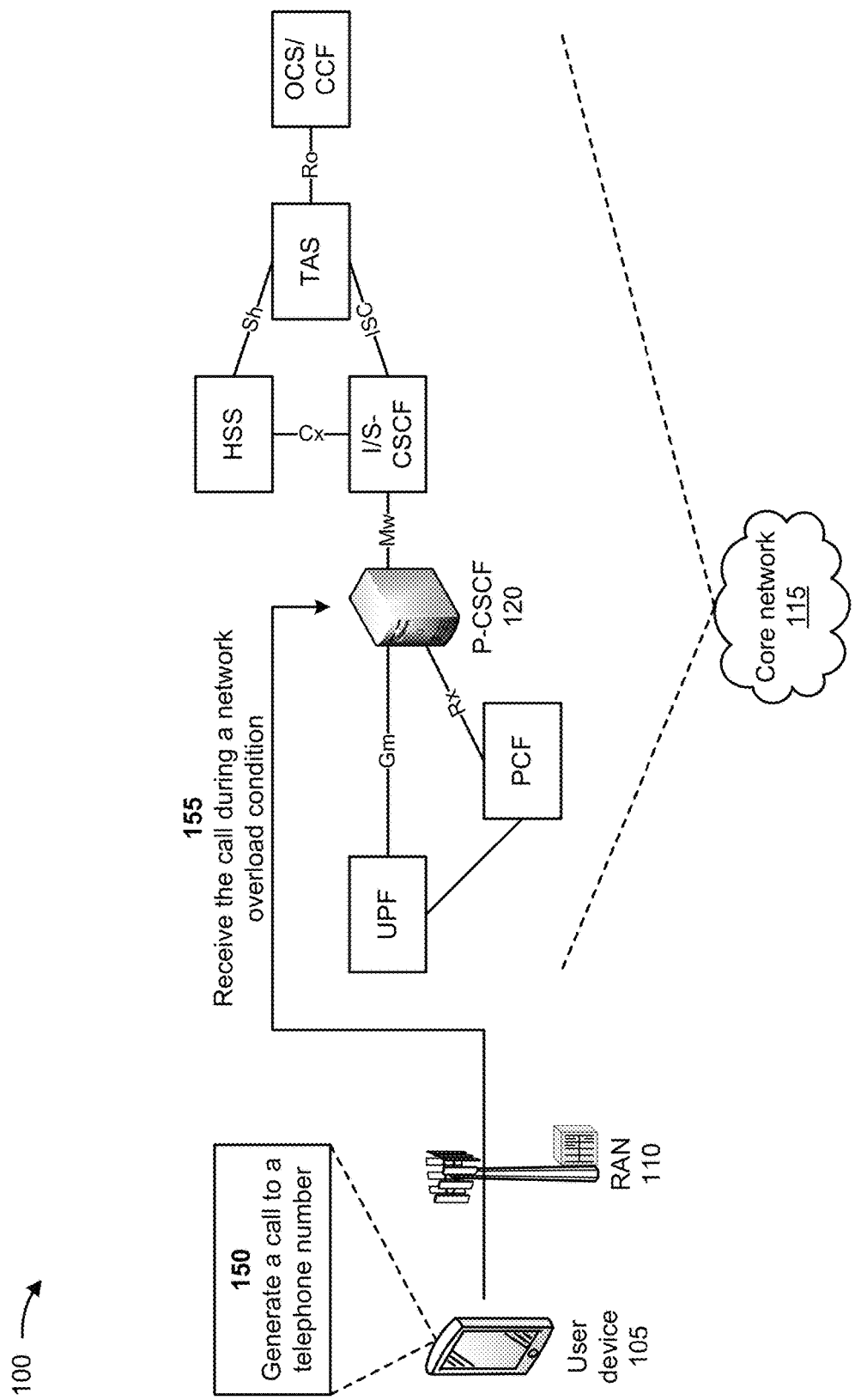

As shown in FIG. 1C, and by reference number 150, the user device may generate a call to a telephone number. For example, a user may utilize the user device 105 to input digits of the telephone number, and the user device 105 may generate the call to the telephone number based on the inputted digits. In some implementations, the telephone number may be associated with a priority service, such as a suicide hotline, a police department, a fire department, a hospital, a poison control service, and/or the like.

As further shown in FIG. 1C, and by reference number 155, the P-CSCF 120 may receive the call during a network overload condition. For example, the P-CSCF 120 may determine that a network overload condition exists in the core network 115 based on a traffic load associated with the core network 115 and/or the P-CSCF 120, an available bandwidth associated with the core network 115 and/or the P-CSCF 120, an indication of occurrence of a particular event, and/or the like. The particular event may include a man-made disaster, a natural disaster, a terrorist attack, and/or the like. When the P-CSCF 120 determines that the network overload condition exists, the P-CSCF 120 may determine whether the call is received during the network overload condition. If the call is not received during the network overload condition, the P-CSCF 120 may process the call according to typical processing procedures. If the call is received during the network overload condition, the P-CSCF 120 may process the call as described below.

Figure 1D:
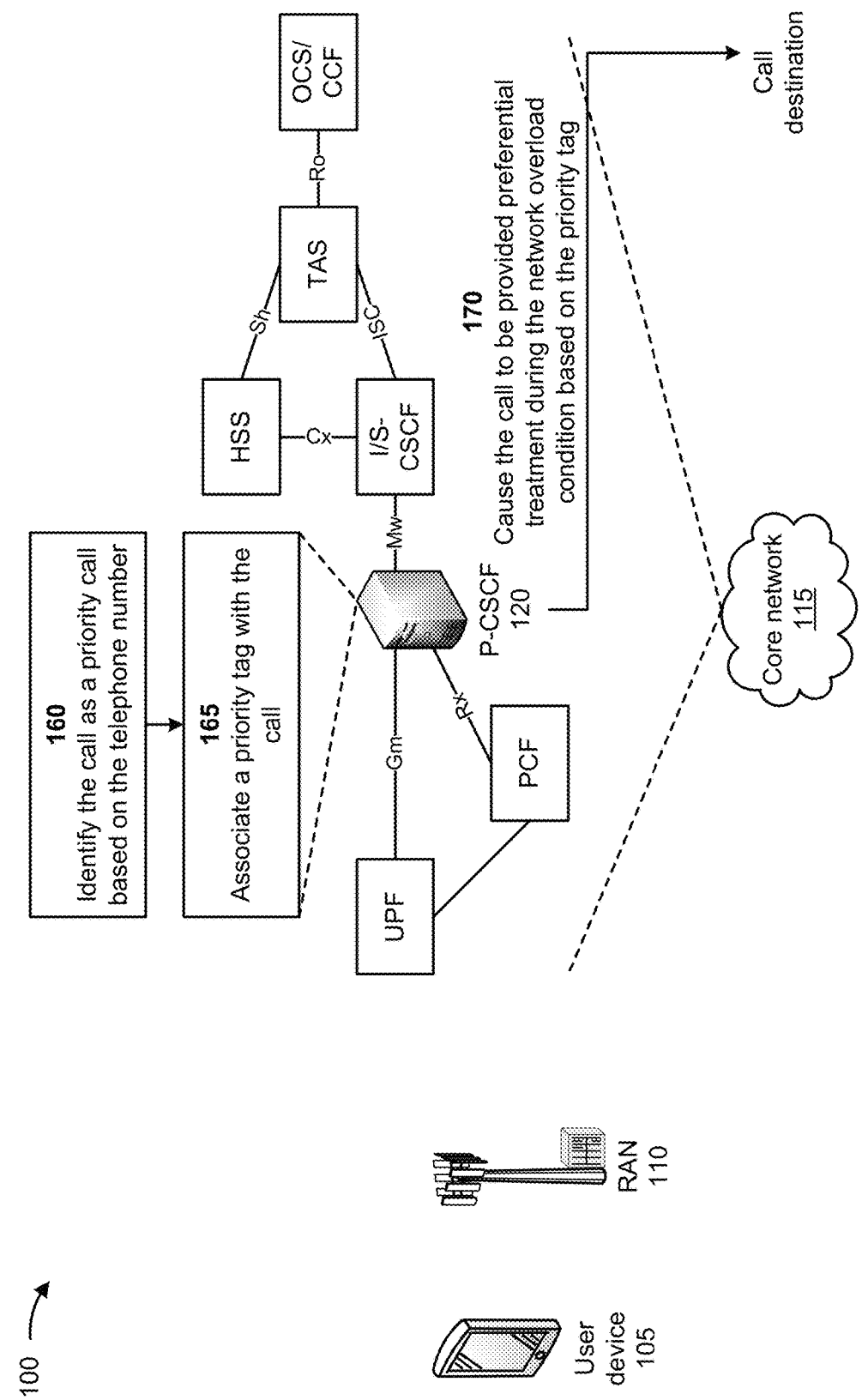

As shown in FIG. 1D, and by reference number 160, the P-CSCF 120 may identify the call as a priority call based on a call identifier (e.g., the telephone number) associated with the call. For example, the P-CSCF 120 may identify the call as a priority call by comparing the call identifier (e.g., digits of the telephone number) with the list of call identifiers (e.g., telephone numbers) associated with priority services. When the call identifier (e.g., the digits of the telephone number) match a call identifier (e.g., digits of a telephone number) in the list of call identifiers (e.g., telephone numbers) associated with priority services, the P-CSCF 120 may identify the call as a priority call. When the call identifier (e.g., the digits of the telephone number) fail to match a call identifier (e.g., digits of a telephone number) in the list of call identifiers (e.g., telephone numbers) associated with priority services, the P-CSCF 120 may not identify the call as a priority call.

As further shown in FIG. 1D, and by reference number 165, the P-CSCF 120 may associate a priority tag with the call. For example, the P-CSCF 120 may associate the priority tag with the call based on identifying the call as a priority call and based on determining that the network overload condition exists. When the call is not identified as a priority call or a network overload condition does not exist, the P-CSCF 120 may not associate the priority tag with the call. The priority tag may indicate that the call is a priority call to subsequent network devices in a path of call delivery. For example, the P-CSCF 120 may utilize the reservation priority AVP and the multimedia priority service AVP, as the priority tag, to indicate the priority of the call to the PCF via an Rx interface between the P-CSCF 120 and the PCF. The P-CSCF 120 may utilize the reservation priority AVP and the multimedia priority service AVP, as the priority tag, to indicate the priority of the call to the UPF via a Gm interface between the P-CSCF 120 and the UPF. The indications of the priority of the call, via the other interfaces depicted in FIG. 1D, are described above in connection with FIG. 1B.

As further shown in FIG. 1D, and by reference number 170, the P-CSCF 120 may cause the call to be provided preferential treatment during the network overload condition based on the priority tag. For example, when causing the call to be provided preferential treatment during the network overload condition based on the priority tag, the P-CSCF 120 may cause, based on the priority tag, one or more other network devices (e.g., the UPF, the PCF, the I/S-CSCF, the HSS, the TAS, the OCS/CCF, and/or the like) to identify the call as a priority call and to provide preferential treatment for the call during the network overload condition. In some implementations, a connection may be established between the user device 105 and a priority service (e.g., a call destination) associated with the telephone number based on causing the call to be provided preferential treatment during the network overload condition. In some implementations, all subsequent call steps for different protocols may include priority tags indicating that the call is a priority call. The subsequent network devices may identify the call as a priority call, may mark the call accordingly (e.g., based on the different protocols), and may provide preferential treatment to the call during the network overload condition.

Figure 1E:
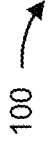

FIGS. 1E and 1F are diagrams of mapping tables capable of being utilized by the P-CSCF 120. As shown in the top mapping table of FIG. 1E, a SIP resource priority header (RPH) may be formatted to include emergency medical services (EMS) priorities (e.g., National Alliance on Mental Illness (NAMI) 988 (ems.1), police (ems.2), fire (ems.3), and poison control (ems.x)), and/or the like. As shown in the bottom mapping table of FIG. 1E, user interactions (e.g., dialed telephone numbers) may be mapped to invocation methods and information included in a SIP invite RPH. As shown, a user interaction of "988" may be mapped to a suicide hotline and a SIP invite RPH that includes ems.1; a user interaction of "xxx-xxx-xxxx" may be mapped to a police station and a SIP invite RPH that includes ems.2; a user interaction of "xxx-xxx-xxxx" may be mapped to another priority service and a SIP invite RPH that includes ems.x; and/or the like. As shown in the mapping table of FIG. 1F, a session priority AVP value may be mapped to a SIP RPH value and a reservation priority AVP value. For example, a session priority AVP of "x" may be mapped to a SIP RPH value of "ems.0" and a reservation priority AVP value of "x"; a session priority AVP of "y" may be mapped to a SIP RPH value of "ems.x" and a reservation priority AVP value of "y"; and/or the like.

FIGS. 1G-1J are call flow diagrams associated with network-based identification of priority services. As shown at step 1 of FIG. 1G, a first user device 105-1 may generate an invite (e.g., based on a mental health telephone number, such as 988) destined for a priority service provided by a second user device 105-2, and may provide the invite to a first P-CSCF 120-1. The first P-CSCF 120-1 may evaluate a dial string (e.g., digits) associated with the telephone number and may insert an RPH with a priority (e.g., ems.x) into the invite. The first P-CSCF 120-1 may provide an AA request (AAR) command, with the priority indicated by a new reservation priority value, to a first PCRF (e.g., PCRF 1). The first PCRF may provide a re-auth request (RAR) command to a first PGW (e.g., PGW 1), and the first PGW may acknowledge receipt of the RAR command via a re-auth acknowledgement (RAA) command.

Figure 1G:
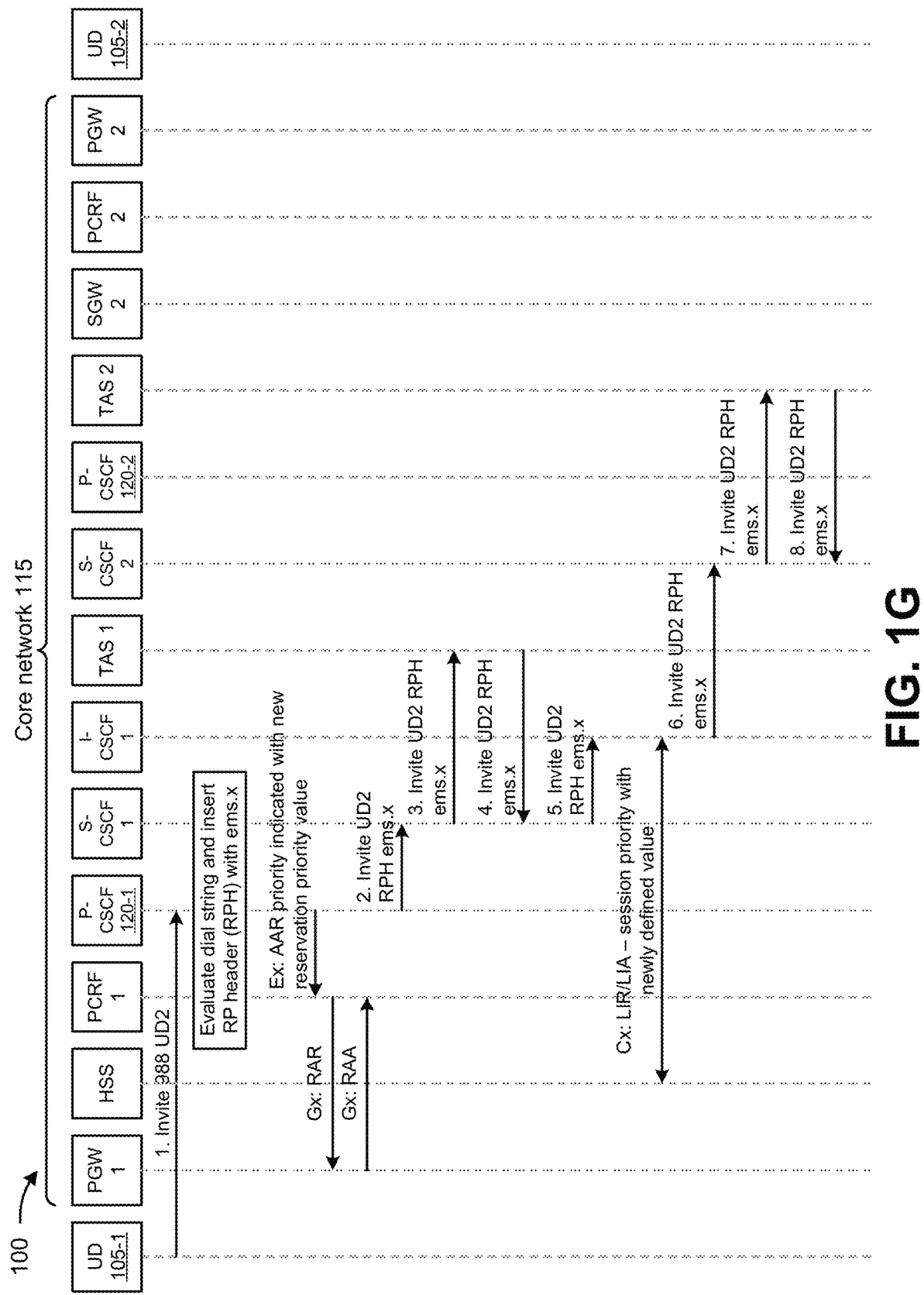

As shown at step 2 of FIG. 1G, the first P-CSCF 120-1 may provide the invite (e.g., identifying the second user device 105-2 and the priority) to a first S-CSCF (e.g., S-CSCF 1). As shown at steps 3 and 4, the first S-CSCF may forward the invite to a first TAS (e.g., TAS 1), and the first TAS may acknowledge receipt of the invite from the first S-CSCF. As shown at step 5 of FIG. 1G, the first S-CSCF may provide the invite to a first I-CSCF (e.g., I-CSCF 1). The first I-CSCF may utilize a location information request (LIR) command and answer (LIA) to notify the HSS of the priority associated with the invite. As shown at step 6 of FIG. 1G, the first I-CSCF may provide the invite to a second S-CSCF (e.g., S-CSCF 2). As shown at steps 7 and 8, the second S-CSCF may forward the invite to a second TAS (e.g., TAS 2), and the second TAS may acknowledge receipt of the invite from the second S-CSCF.

Figure 1H:
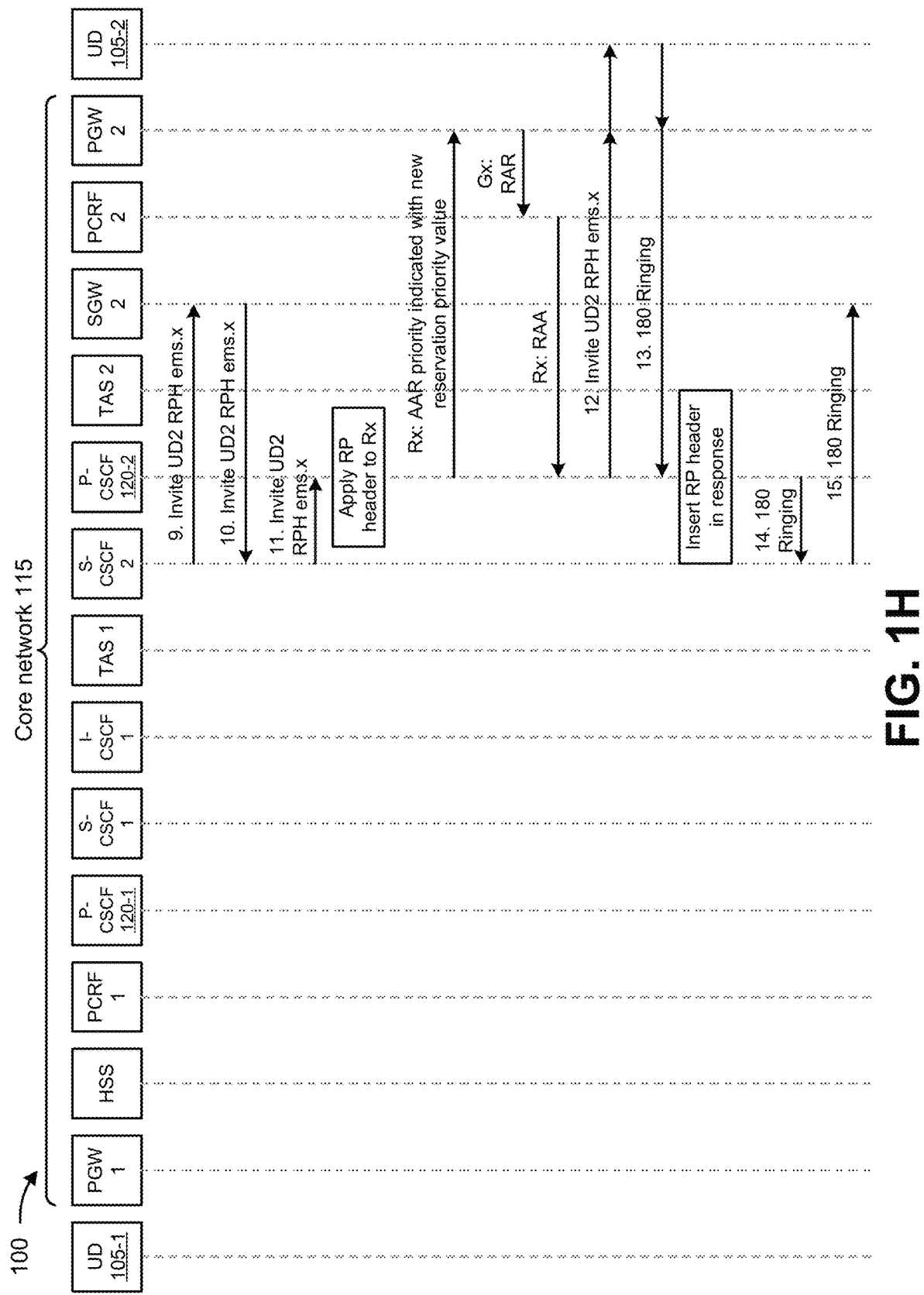

As shown at steps 9 and 10 of FIG. 1H, the second S-CSCF may forward the invite to a second SGW (e.g., SGW 2), and the second SGW may acknowledge receipt of the invite from the second S-CSCF. As shown at step 11, the second S-CSCF may provide the invite to a second P-CSCF 120-2. The second P-CSCF 120-2 may apply the RP header to an Rx interface, and may provide an AAR command, with the priority indicated by a new reservation priority value, to a second PGW (e.g., PGW 2). The second PGW may provide an RAR command to a second PCRF (e.g., PCRF 2), and the second PCRF may acknowledge receipt of the RAR command via an RAA command provided to the second P-CSCF 120-2. As shown at step 12 of FIG. 1H, the second P-CSCF 120-2 may provide the invite to the second user device 105-2, via the second PGW. As shown at step 13, the second user device 105-2 may provide, in response to the invite, a ringing response to the second P-CSCF 120-2, via the second PGW. The second P-CSCF 120-2 may insert the RP header in the ringing response. As shown at step 14 of FIG. 1H, the second P-CSCF 120-2 may provide the ringing response (e.g., with the inserted RP header) to the second S-CSCF. As shown at step 15, the second S-CSCF may provide the ringing response to the second SGW.

Figure 1I:
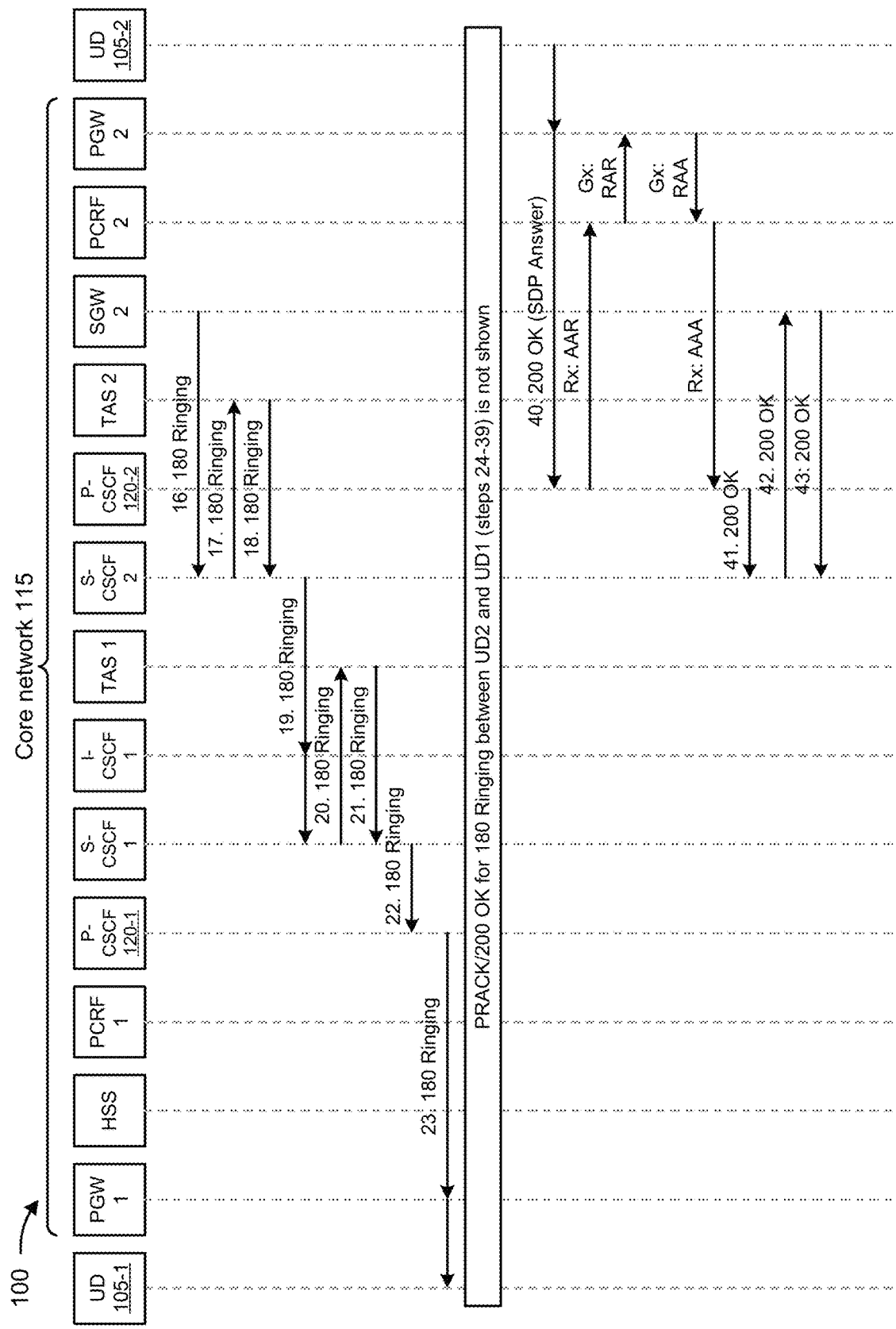

As shown at step 16 of FIG. 1I, the second SGW may provide an acknowledgement of the ringing response to the second S-CSCF. As shown at steps 17 and 18, the second S-CSCF may forward the ringing response to the second TAS, and the second TAS may acknowledge receipt of the ringing response from the second S-CSCF. As shown at step 19, the second S-CSCF may forward the ringing response to the first S-CSCF, via the first I-CSCF. As shown at steps 20 and 21, the first S-CSCF may forward the ringing response to the first TAS, and the first TAS may acknowledge receipt of the ringing response from the first S-CSCF. As shown at steps 22 and 23 of FIG. 1I, the first S-CSCF may forward the ringing response to the first P-CSCF 120-1, and the first P-CSCF 120-1 may forward the ringing response to the first user device 105-1, via the first PGW. Steps 24-39, associated with acknowledgement of the ringing response and setting up the call between the first user device 105-1 and the second user device 105-2, are not shown in FIG. 1I for ease of explanation.

As shown at step 40 of FIG. 1I, the second user device 105-2 may provide an answer (e.g., a 200 OK answer to the call) to the second P-CSCF 120-2, via the second PGW. The second P-CSCF 120-2 may provide an AAR command, with the priority indicated by a new reservation priority value, to the second PCRF. The second PCRF may provide an RAR command to the second PGW, and the second PGW may acknowledge receipt of the RAR command via an RAA command provided to the second PCRF. The second PCRF may provide an acknowledgement of the AAR command (e.g., an AAA) to the second P-CSCF 120-2. As shown at step 41, the second P-CSCF 120-2 may provide the answer to the second S-CSCF. As shown at steps 42 and 43, the second S-CSCF may forward the answer to the second SGW, and the second SGW may acknowledge receipt of the answer from the second S-CSCF.

Figure 1J:
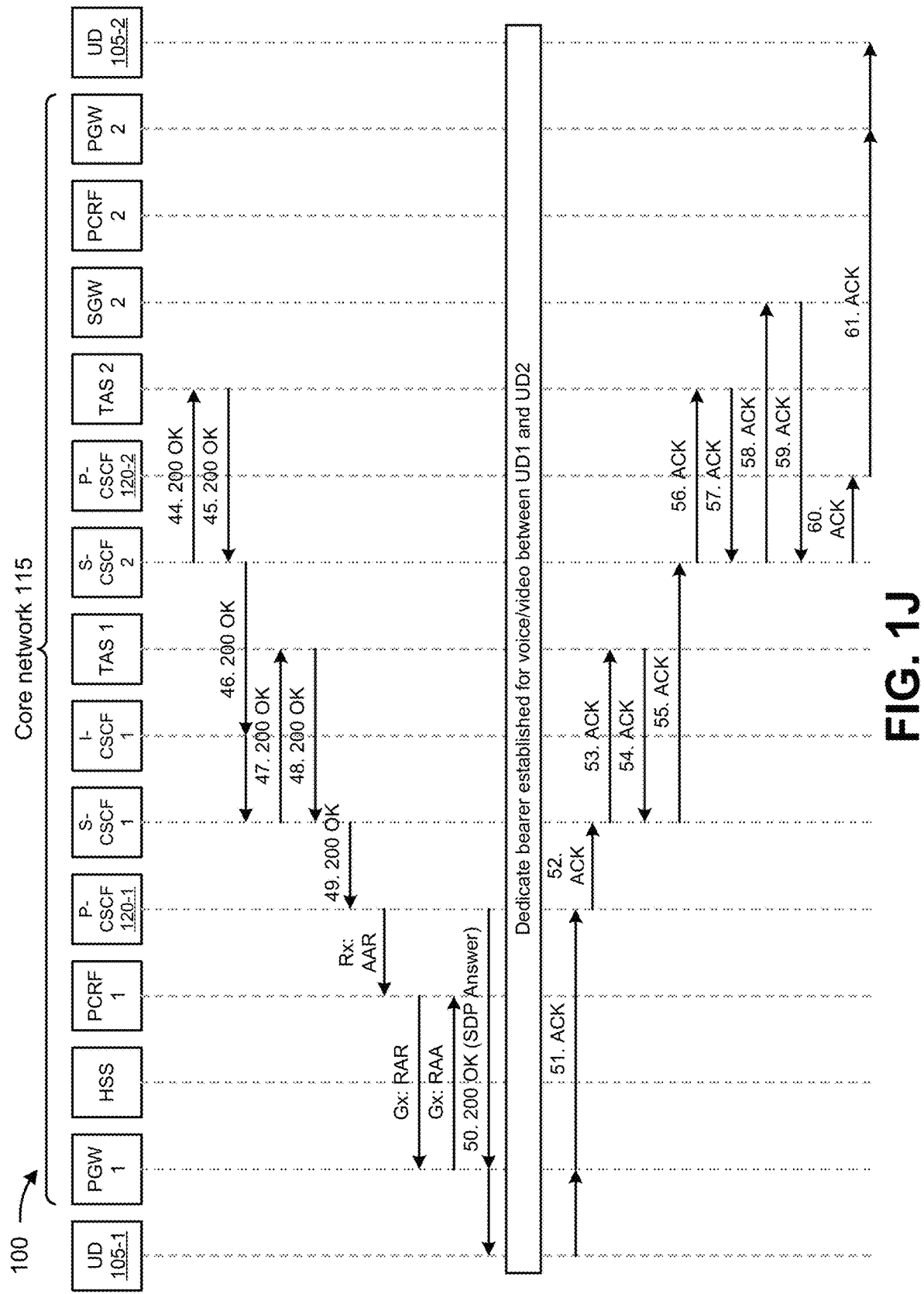

As shown at steps 44 and 45 of FIG. 1J, the second S-CSCF may forward the answer to the second TAS, and the second TAS may acknowledge receipt of the answer from the second S-CSCF. As shown at step 46, the second S-CSCF may forward the answer to the first S-CSCF, via the first I-CSCF. As shown at steps 47 and 48, the first S-CSCF may forward the answer to the first TAS, and the first TAS may acknowledge receipt of the answer from the first S-CSCF. As shown at step 49 of FIG. 1J, the first S-CSCF may forward the answer to the first P-CSCF 120-1. The first P-CSCF 120-1 may provide an AAR command, with the priority indicated by a new reservation priority value, to the first PCRF. The first PCRF may provide an RAR command to the first PGW, and the first PGW may acknowledge receipt of the RAR command via an RAA command provided to the first PCRF. As shown at step 50, the first P-CSCF 120-1 may forward the answer to the first user device 105-1, via the first PGW. At this point, a dedicated bearer may be established for voice and/or video between the first user device 105-1 and the second user device 105-2.

As shown at step 51 of FIG. 1J, the first user device 105-1 may provide an acknowledgement (e.g., in response to establishment of the dedicated bearer) to the first P-CSCF 120-1. As shown at step 52, the first P-CSCF 120-1 may forward the acknowledgement to the first S-CSCF. As shown at steps 53 and 54, the first S-CSCF may forward the acknowledgement to the first TAS, and the first TAS may acknowledge receipt of the acknowledgement from the first S-CSCF. As shown at step 55, the first S-CSCF may forward the acknowledgement to the second S-CSCF. As shown at steps 56 and 57, the second S-CSCF may forward the acknowledgement to the second TAS, and the second TAS may acknowledge receipt of the acknowledgement from the second S-CSCF. As shown at steps 58 and 59, the second S-CSCF may forward the acknowledgement to the second SGW, and the second SGW may acknowledge receipt of the acknowledgement from the second S-CSCF. As shown at steps 60 and 61, the second S-CSCF may forward the acknowledgement to the second P-CSCF 120-2, and the second P-CSCF 120-2 may forward the acknowledgement to the second user device 105-2, via the second PGW.

In this way, the P-CSCF 120 provides network-based identification of priority services. For example, the P-CSCF 120 may ensure that a priority call (e.g., a 988 suicide hotline call, a call to a local police department, a call to a local fire department, and/or the like) has an increased probability of call completion and is not dropped when a network experiences an overload condition. The P-CSCF 120 may ensure that priority calls receive preferential treatment by the network during a network overload condition. Therefore, the P-CSCF 120 may increase call completion rates for any newly-defined priority calls. Thus, the P-CSCF 120 may conserve computing resources, networking resources, and/or other resources that would otherwise have been consumed by causing user devices 105 to place priority calls multiple times before connecting to priority services, handling multiple priority calls from the same user devices 105, handling dropped priority calls, failing to connect priority calls to priority services, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
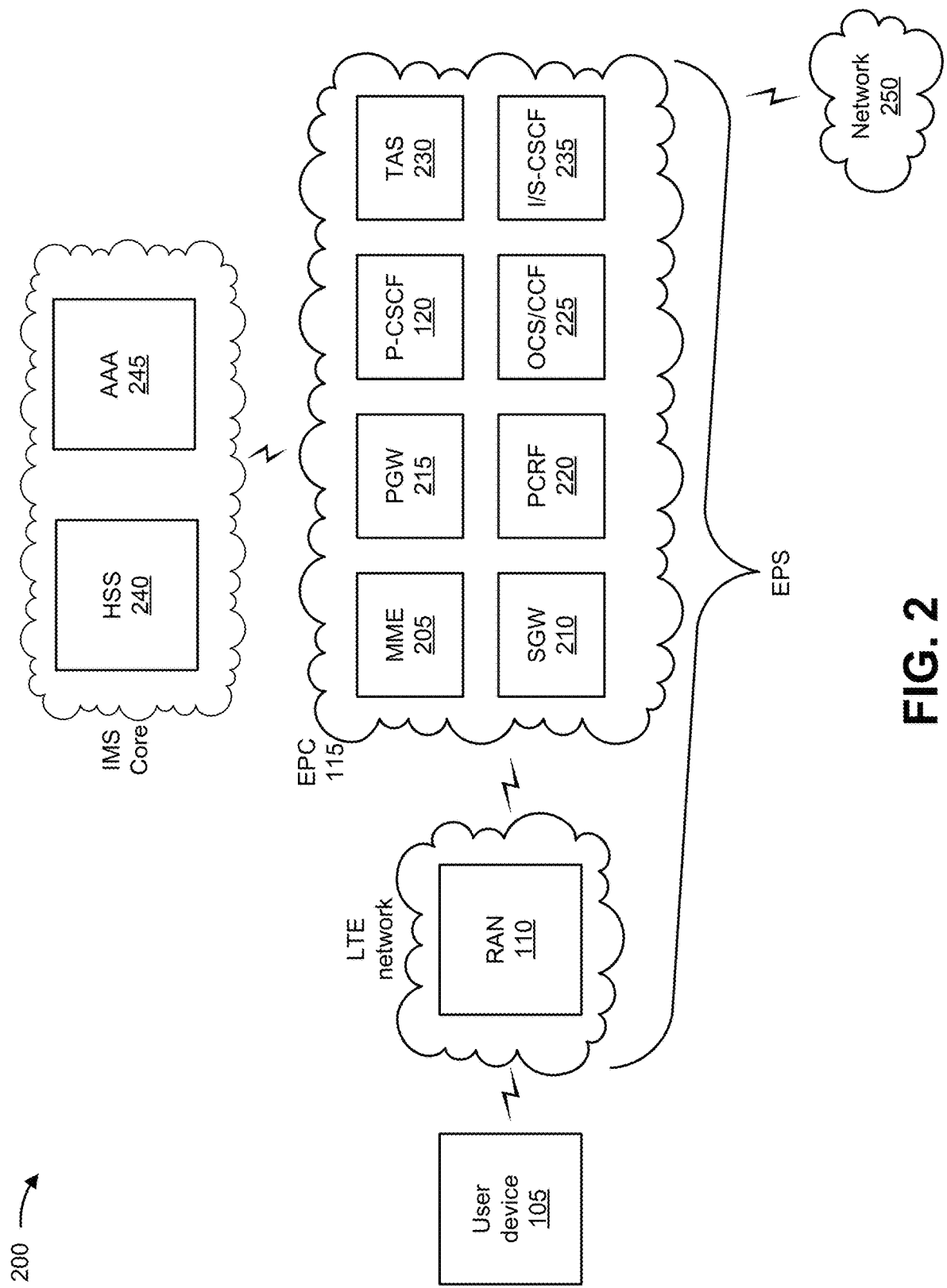
FIGS. 2 and 3 are diagrams of example environments in which systems and/or methods described herein may be implemented.

FIG. 2 is a diagram of an example environment 200 in which systems and/or methods, described herein, may be implemented. As shown in FIG. 2, the environment 200 may include the user device 105, the RAN 110, and the core network 115. The core network 115 may include the P-CSCF 120, a mobility management entity device (MME) 205, SGW 210, a PGW 215, a PCRF 220, an OCS/CCF 225, a TAS 230, an I/S-CSCF 235, an HSS 240, an authentication, authorization, and accounting server (AAA) 245, and a network 250. Devices of the environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

Some implementations are described herein as being performed within a long-term evolution (LTE) network for explanatory purposes. Some implementations may be performed within a network that is not an LTE network, such as a third generation (3G) network or a 5G network.

The environment 200 may include an evolved packet system (EPS) that includes an LTE network and/or an evolved packet core (EPC) (e.g., the core network 115) that operate based on a third-generation partnership project (3GPP) wireless communication standard. The LTE network may include a RAN that includes one or more RANs 110 that take the form of evolved Node Bs (eNBs) via which the user device 105 communicates with the EPC 115. The EPC 115 may include the P-CSCF 120, the MME 205, the SGW 210, the PGW 215, the PCRF 220, the OCS/CCF 225, the TAS 230, and/or the I/S-CSCF 235 to enable the user device 105 to communicate with the network 250 and/or an Internet protocol (IP) multimedia subsystem (IMS) core. The IMS core may include the HSS 240 and/or the AAA 245, and may manage device registration and authentication, session initiation, and/or other operations associated with user devices 105. The HSS 240 and/or the AAA 245 may reside in the EPC 115 and/or the IMS core.

The P-CSCF 120 includes one or more devices that manage all signaling from an end user to services and other networks. The P-CSCF 120 may control both fixed and mobile IMSs, may allocate application servers, may establish emergency connections, and may control communication with other networks.

The MME 205 includes one or more devices, such as one or more server devices, capable of managing authentication, activation, deactivation, and/or mobility functions associated with the user device 105. In some implementations, the MME 205 may perform operations relating to authentication of the user device 105. Additionally, or alternatively, the MME 205 may facilitate the selection of a particular SGW 210 and/or a particular PGW 215 to provide traffic to and/or from the user device 105. The MME 205 may perform operations associated with handing off the user device 105 from a first RAN 110 to a second RAN 110 when the user device 105 is transitioning from a first cell associated with the first RAN 110 to a second cell associated with the second RAN 110. Additionally, or alternatively, the MME 205 may select another MME (not pictured), to which the user device 105 should be handed off (e.g., when the user device 105 moves out of range of the MME 205).

The SGW 210 includes one or more devices capable of routing packets. For example, the SGW 210 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, the SGW 210 may aggregate traffic received from one or more RANs 110 associated with the LTE network, and may send the aggregated traffic to the network 250 (e.g., via the PGW 215) and/or other network devices associated with the EPC 115 and/or the IMS core. The SGW 210 may receive traffic from the network 250 and/or other network devices, and may send the received traffic to the user device 105 via the RAN 110. Additionally, or alternatively, the SGW 210 may perform operations associated with handing off the user device 105 to and/or from an LTE network.

The PGW 215 includes one or more devices capable of providing connectivity for the user device 105 to external packet data networks (e.g., other than the depicted EPC 115 and/or the LTE network). For example, the PGW 215 may include one or more data processing and/or traffic transfer devices, such as a gateway, a router, a modem, a switch, a firewall, a MC, a hub, a bridge, a server device, an OADM, or any other type of device that processes and/or transfers traffic. In some implementations, the PGW 215 may aggregate traffic received from one or more SGWs 210, and may send the aggregated traffic to the network 250. Additionally, or alternatively, the PGW 215 may receive traffic from the network 250, and may send the traffic to the user device 105 via the SGW 210 and the RAN 110. The PGW 215 may record data usage information (e.g., byte usage), and may provide the data usage information to the AAA 245.

The PCRF 220 includes one or more devices, such as one or more server devices, capable of providing policy control decision and flow-based charging control functionalities. For example, the PCRF 220 may provide network control regarding service data flow detection, gating, and/or quality of service (QoS) and flow-based charging, among other examples. In some implementations, the PCRF 220 may determine how a certain service data flow is to be treated, and may ensure that user plane traffic mapping and treatment is in accordance with a user subscription profile.

The OCS/CCF 225 includes one or more devices, such as one or more server devices, that enable a cellular network service provider to charge customers (e.g., user devices 105), in real time, based on service usage. The OCS/CCF 225 may enable offline charging of network devices of the IMS core to report accounting information. The OCS/CCF 225 may utilize the accounting information to construct and format a call detail recording.

The TAS 230 includes one or more devices, such as one or more server devices, that provide telephony applications and additional multimedia functions. The TAS 230 may be deployed in the core network 115 and/or the IMS core, and may provide call control and media transformation, such as a soft switch or a media gateway. The TAS 230 may emulate calling features, such as call forwarding, voicemail and conference bridges, and may provide additional multimedia features, such as unified messaging, video calling, and the integration of softphone clients on multiple devices.

The I/S-CSCF 235 includes one or more devices that manage all signaling from an end user to services and other networks. The I/S-CSCF 235 may control both fixed and mobile IMSs, may allocate application servers, may establish emergency connections, and may control communication with other networks.

The HSS 240 includes one or more devices, such as one or more server devices, capable of managing (e.g., receiving, generating, storing, processing, and/or providing) information associated with the user device 105. For example, the HSS 240 may manage subscription information associated with the user device 105, such as information that identifies a subscriber profile of a user associated with the user device 105, information that identifies services and/or applications that are accessible to the user device 105, location information associated with the user device 105, a network identifier (e.g., a network address) that identifies the user device 105, information that identifies a treatment of the user device 105 (e.g., quality of service information, a quantity of minutes allowed per time period, a quantity of data consumption allowed per time period, etc.), and/or similar information. The HSS 240 may provide this information to one or more other devices of the environment 200 to support the operations performed by those devices.

The AAA 245 includes one or more devices, such as one or more server devices, that perform authentication, authorization, and/or accounting operations for communication sessions associated with the user device 105. For example, the AAA 245 may perform authentication operations for the user device 105 and/or a user of the user device 105 (e.g., using one or more credentials), may control access, by the user device 105, to a service and/or an application (e.g., based on one or more restrictions, such as time-of-day restrictions, location restrictions, single or multiple access restrictions, read/write restrictions, etc.), may track resources consumed by the user device 105 (e.g., a quantity of voice minutes consumed, a quantity of data consumed, etc.), and/or may perform similar operations.

The network 250 includes one or more wired and/or wireless networks. For example, the network 250 may include a cellular network (e.g., a 5G network, an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 3 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
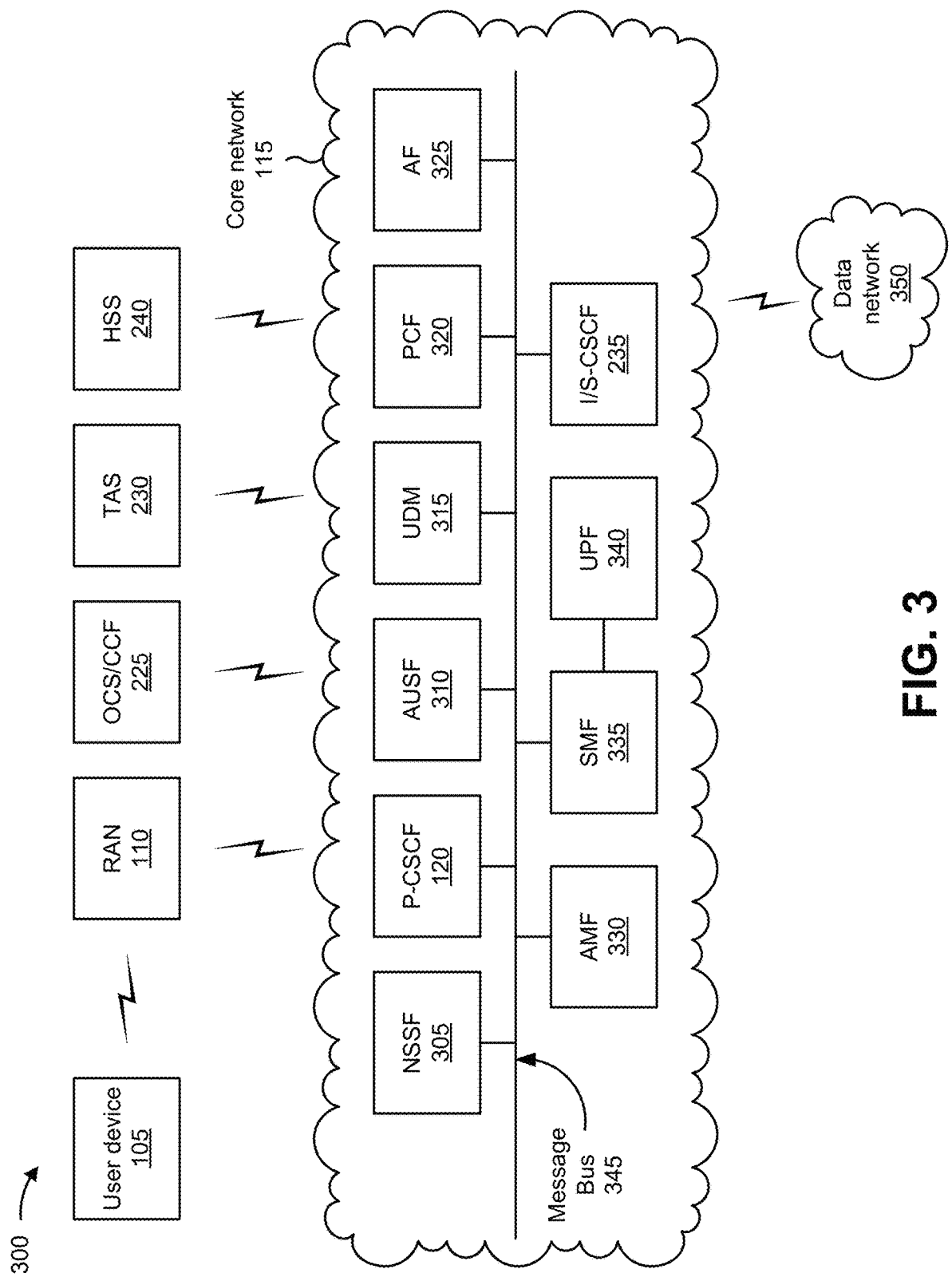

FIG. 3 is a diagram of an example environment 300 in which systems and/or methods described herein may be implemented. As shown in FIG. 3, the example environment 300 may include the user device 105, the RAN 110, the core network 115, the OCS/CCF 225, the TAS 230, the HSS 240, and a data network 350. Details of the user device 105, the RAN 110, the OCS/CCF 225, the TAS 230, and the HSS 240 are provided elsewhere herein. Devices and/or networks of the example environment 300 may interconnect via wired connections, wireless connections, or a combination of wired and wireless connections.

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 3 may be an example of a service-based architecture, in some implementations, the core network 115 may be implemented as a reference-point architecture and/or a 4G core network, among other examples.

As shown in FIG. 3, the core network 115 may include a number of functional elements. The functional elements may include, for example, the P-CSCF 120, the I/S-CSCF 235, a network slice selection function (NSSF) 305, an authentication server function (AUSF) 310, a unified data management (UDM) component 315, a PCF 320, an application function (AF) 325, an access and mobility management function (AMF) 330, a session management function (SMF) 335, and/or a user plane function (UPF) 340. Details of the P-CSCF 120 and the I/S-CSCF 235 are provided elsewhere herein. The functional elements may be communicatively connected via a message bus 345. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 305 includes one or more devices that select network slice instances for the user device 105. By providing network slicing, the NSSF 305 allows an operator to deploy multiple substantially independent end-to-end networks potentially with the same infrastructure. In some implementations, each slice may be customized for different services.

The AUSF 310 includes one or more devices that act as an authentication server and support the process of authenticating the user device 105 in the wireless telecommunications system.

The UDM 315 includes one or more devices that store user data and profiles in the wireless telecommunications system. The UDM 315 may be used for fixed access and/or mobile access in the core network 115.

The PCF 320 includes one or more devices that provide a policy framework that incorporates network slicing, roaming, packet processing, and/or mobility management, among other examples.

The AF 325 includes one or more devices that support application influence on traffic routing, access to a network exposure function (NEF), and/or policy control, among other examples.

The AMF 330 includes one or more devices that act as a termination point for non-access stratum (NAS) signaling and/or mobility management, among other examples.

The SMF 335 includes one or more devices that support the establishment, modification, and release of communication sessions in the wireless telecommunications system. For example, the SMF 335 may configure traffic steering policies at the UPF 340 and/or may enforce user equipment IP address allocation and policies, among other examples.

The UPF 340 includes one or more devices that serve as an anchor point for intraRAT and/or interRAT mobility. The UPF 340 may apply rules to packets, such as rules pertaining to packet routing, traffic reporting, and/or handling user plane QoS, among other examples.

The message bus 345 represents a communication structure for communication among the functional elements. In other words, the message bus 345 may permit communication between two or more functional elements.

The data network 350 includes one or more wired and/or wireless data networks. For example, the data network 350 may include an IMS, a PLMN, a LAN, a WAN, a MAN, a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the example environment 300 may perform one or more functions described as being performed by another set of devices of the example environment 300.

Figure 4:
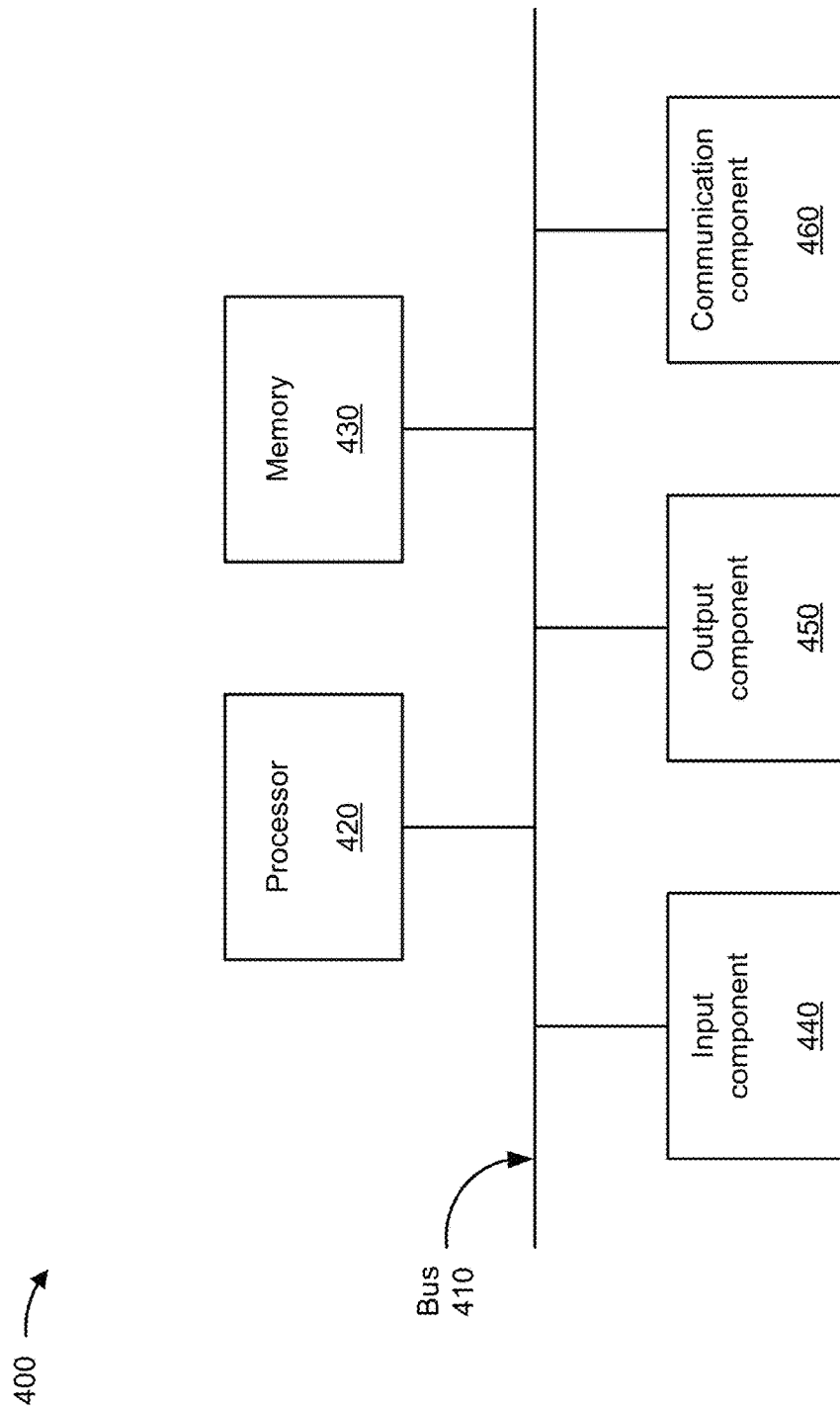
FIG. 4 is a diagram of example components of one or more devices of FIGS. 2 and 3.

FIG. 4 is a diagram of example components of a device 400, which may correspond to the user device 105, the RAN 110, the P-CSCF 120, the MME 205, the SGW 210, the PGW 215, the PCRF 220, the OCS/CCF 225, the TAS 230, the I/S-CSCF 235, the HSS 240, the AAA 245, the NSSF 305, the AUSF 310, the UDM 315, the PCF 320, the AF 325, the AMF 330, the SMF 335, and/or the UPF 340. In some implementations, the user device 105, the RAN 110, the P-CSCF 120, the MME 205, the SGW 210, the PGW 215, the PCRF 220, the OCS/CCF 225, the TAS 230, the I/S-CSCF 235, the HSS 240, the AAA 245, the NSSF 305, the AUSF 310, the UDM 315, the PCF 320, the AF 325, the AMF 330, the SMF 335, and/or the UPF 340 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for network-based identification of priority services. In some implementations, one or more process blocks of FIG. 5 may be performed by a network device (e.g., the P-CSCF 120). In some implementations, one or more process blocks of FIG. 5 may be performed by another device or a group of devices separate from or including the network device, such as an SGW (e.g., the SGW 210), a PCRF (e.g., the PCRF 220), an OCS/CCF (e.g., the OCS/CCF 225), a TAS (e.g., the TAS 230), an I/S-CSCF (e.g., the I/S-CSCF 235), an HSS (e.g., the HSS 240), a PCF (e.g., the PCF 320), and/or a UPF (e.g., the UPF 340). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving, from a user device, a call associated with a telephone number and intended for a priority service associated with the telephone number (block 510). For example, the network device may receive, from a user device, a call associated with a telephone number, as described above. In some implementations, the call is intended for a priority service associated with the telephone number. In some implementations, the telephone number is associated with one or more of a suicide hotline, a police department, a fire department, a hospital, or a poison control service.

In some implementations, the network device is a P-CSCF. In some implementations, the network device is associated with a fourth generation network or a fifth generation network.

As further shown in FIG. 5, process 500 may include identifying the call as a priority call based on the telephone number associated with the call (block 520). For example, the network device may identify the call as a priority call based on the telephone number associated with the call, as described above. In some implementations, identifying the call as a priority call based on the telephone number associated with the call includes comparing digits of the telephone number with a list of telephone numbers associated with priority services, and identifying the call as a priority call based on the digits matching digits of a telephone number in the list of telephone numbers associated with priority services.

As further shown in FIG. 5, process 500 may include determining that a network overload condition exists (block 530). For example, the network device may determine that a network overload condition exists, as described above. In some implementations, the network overload condition is due to one or more of a natural disaster, a man-made disaster, or a terrorist attack.

As further shown in FIG. 5, process 500 may include associating a priority tag with the call based on identifying the call as a priority call (block 540). For example, the network device may associate a priority tag with the call based on identifying the call as a priority call, as described above. In some implementations, associating the priority tag with the call includes associating a reservation priority attribute-value pair (AVP) and a multimedia priority service AVP, as the priority tag, with the call. In some implementations, associating the priority tag with the call includes associating a session initiation protocol resource priority header, as the priority tag, with the call. In some implementations, associating the priority tag with the call includes associating a session priority attribute-value pair, as the priority tag, with the call. In some implementations, the priority tag causes one or more other network devices to modify the priority tag based on one or more protocols associated with the one or more other network devices.

As further shown in FIG. 5, process 500 may include causing the call to be provided preferential treatment based on the priority tag (block 550). For example, the network device may cause the call to be provided preferential treatment, while the call is transmitted for the priority service during the network overload condition, based on the priority tag, as described above. In some implementations, causing the call to be provided preferential treatment during the network overload condition based on the priority tag includes causing, based on the priority tag, one or more other network devices to identify the call as a priority call and to provide preferential treatment for the call during the network overload condition. In some implementations, a connection is established between the user device and a priority service associated with the telephone number based on causing the call to be provided preferential treatment during the network overload condition. In some implementations, the one or more other network devices include one or more of a UPF, a PCF, an I/S-CSCF, an HSS, a TAS, or an OCS/CCF.

In some implementations, process 500 includes storing, in a data structure, a mapping of session priority AVP values associated with priority services, session initiation protocol resource priority headers associated with the priority services, and reservation priority AVP values associated with the priority services, and generating the priority tag based on the mapping.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device and from a user device, a call associated with a telephone number, the call being intended for a priority service associated with the telephone number;
   determining, by the network device, that a network overload condition exists;
   determining, by the network device, whether the call is received during the network overload condition;
   selectively identifying, by the network device and based on determining that the call is received during the network overload condition, the call as a priority call based on comparing the telephone number associated with the call with a list of call identifiers associated with priority services;
   storing, by the network device, a mapping of session priority attribute-value pair (AVP) values associated with the priority services, session initiation protocol resource priority headers associated with the priority services, and reservation priority AVP values associated with the priority services;
   generating, by the network device, a priority tag based on the mapping;
   selectively associating, by the network device, the priority tag with the call based on identifying the call as a priority call and based on determining that the network overload condition exists; and
   causing, by the network device, the call to be provided preferential treatment, while the call is transmitted for the priority service during the network overload condition, based on the priority tag.

2. The method of claim 1, wherein the telephone number is associated with one or more of:
   a suicide hotline,
   a police department,
   a fire department,
   a hospital, or
   a poison control service.

3. The method of claim 1, wherein causing the call to be provided preferential treatment during the network overload condition based on the priority tag comprises:
   causing, based on the priority tag, one or more other network devices to identify the call as a priority call and to provide preferential treatment for the call during the network overload condition.

4. The method of claim 3, wherein the one or more other network devices include one or more of:
   user plane function,
   a policy control function,
   a home subscriber server,
   an interrogating or serving call session control function,
   a telephony application server, or
   an online charging system/charging collection function.

5. The method of claim 1, wherein associating the priority tag with the call comprises:
   associating a reservation priority AVP and a multimedia priority service AVP, as the priority tag, with the call.

6. The method of claim 1, wherein associating the priority tag with the call comprises:
   associating a session initiation protocol resource priority header, as the priority tag, with the call.

7. The method of claim 1, wherein associating the priority tag with the call comprises:
   associating a session priority AVP, as the priority tag, with the call.

8. A network device, comprising:
   one or more processors configured to:
   receive, from a user device, a call associated with a telephone number;
   determine whether the call is received during a network overload condition;
   identify, after determining that the call is received during the network overload condition, the call as a priority call based on comparing the telephone number associated with the call with a list of call identifiers associated with priority services;
   store a mapping of session priority attribute-value pair (AVP) values associated with the priority services, session initiation protocol resource priority headers associated with the priority services, and reservation priority AVP values associated with the priority services;
   generate a priority tag based on the mapping;
   associate the priority tag with the call based on identifying the call as a priority call and based on determining that the network overload condition exists; and
   cause the call to be provided preferential treatment during the network overload condition throughout a network associated with the network device and based on the priority tag.

9. The network device of claim 8, wherein the one or more processors, to identify the call as a priority call based on comparing the telephone number associated with the call with a list of call identifiers associated with the priority services, are configured to:
   compare digits of the telephone number with a list of telephone numbers associated with the priority services; and identify the call as a priority call based on the digits of the telephone number matching digits of a telephone number in the list of telephone numbers associated with the priority services.

10. The network device of claim 8, wherein the network device is a proxy call session control function.

11. The network device of claim 8, wherein the network device is associated with a fourth generation network or a fifth generation network.

12. The network device of claim 8, wherein the priority tag causes one or more other network devices to modify the priority tag based on one or more protocols associated with the one or more other network devices.

13. The network device of claim 8, wherein a connection is established between the user device and a priority service associated with the telephone number based on causing the call to be provided preferential treatment during the network overload condition.

14. A non-transitory computer-readable medium storing a set of instructions, the set of instructions comprising:
one or more instructions that, when executed by one or more processors of a network device, cause the network device to:
determine that a network overload condition exists in a network associated with the network device;
receive, from a user device, a call associated with a telephone number;
determine whether the call is received during the network overload condition;
selectively identify, based on determining whether the call is received during the network overload condition, the call as a priority call based on the telephone number associated with the call;
store a mapping of session priority attribute-value pair (AVP) values associated with priority services, session initiation protocol resource priority headers associated with the priority services, and reservation priority AVP values associated with the priority services;
generate a priority tag based on the mapping;
selectively associate the priority tag with the call based on identifying the call as a priority call and based on determining that the network overload condition exists; and
cause the call to be provided preferential treatment during the network overload condition based on the priority tag,
wherein a connection is to be established between the user device and a priority service associated with the telephone number based on causing the call to be provided preferential treatment during the network overload condition.

15. The non-transitory computer-readable medium of claim 14, wherein the one or more instructions, that cause the network device to cause the call to be provided preferential treatment during the network overload condition based on the priority tag, cause the network device to:
cause, based on the priority tag, one or more other network devices to identify the call as a priority call and to provide preferential treatment for the call during the network overload condition.

16. The non-transitory computer-readable medium of claim 14, wherein the one or more instructions, that cause the network device to associate the priority tag with the call, cause the network device to:
associate a reservation priority AVP and a multimedia priority service AVP, as the priority tag, with the call.

17. The non-transitory computer-readable medium of claim 14, wherein the one or more instructions, that cause the network device to associate the priority tag with the call, cause the network device to:
associate a session initiation protocol resource priority header, as the priority tag, with the call.

18. The non-transitory computer-readable medium of claim 15, wherein the one or more instructions, that cause the network device to selectively identify the call as a priority call based on the telephone number associated with the call, cause the network device to:
compare the telephone number with a list of priority telephone numbers associated with the priority services after determining that the call is received during the network overload condition; and
identify the call as a priority call based on the telephone number matching a priority telephone number in the list of priority telephone numbers associated with the priority services.

19. The network device of claim 8, wherein the one or more processors, to associate the priority tag with the call, are configured to:
associate a reservation priority AVP and a multimedia priority service AVP, as the priority tag, with the call.

20. The non-transitory computer-readable medium of claim 14, wherein the one or more instructions, that cause the network device to associate the priority tag with the call, cause the network device to:
associate a session priority AVP, as the priority tag, with the call.

* * * * *